United States Patent

Freeman

[11] Patent Number: 5,141,273
[45] Date of Patent: Aug. 25, 1992

[54] MOLDED COMPOSITE BUMPER

[75] Inventor: Richard B. Freeman, Oxford, Mich.

[73] Assignee: The Budd Company, Troy, Mich.

[21] Appl. No.: 687,379

[22] Filed: Apr. 18, 1991

Related U.S. Application Data

[63] Continuation-in-part of Ser. No. 419,745, Oct. 11, 1989, abandoned.

[51] Int. Cl.⁵ .............................................. B60R 19/03
[52] U.S. Cl. ...................................... 293/122; 293/120
[58] Field of Search ....................... 293/102, 120, 122; 296/901

[56] References Cited

U.S. PATENT DOCUMENTS

| | | |
|---|---|---|
| 3,883,168 | 5/1975 | Goupy et al. . |
| 3,895,835 | 7/1975 | Thomson ............................ 293/1 X |
| 4,208,069 | 6/1980 | Huber et al. . |
| 4,241,945 | 12/1980 | Huber et al. . |
| 4,252,355 | 2/1981 | Goupy et al. ........................ 293/120 |
| 4,440,429 | 4/1984 | Eyb . |
| 4,466,646 | 8/1984 | Delmastro et al. . |
| 4,525,005 | 6/1985 | Prochaska et al. . |
| 4,586,738 | 5/1986 | Butler et al. . |
| 4,671,550 | 6/1987 | Molnar . |
| 4,724,115 | 2/1988 | Freeman . |
| 4,849,147 | 7/1989 | Freeman . |
| 4,863,771 | 9/1989 | Freeman . |

FOREIGN PATENT DOCUMENTS

| | | |
|---|---|---|
| 55364 | 7/1982 | European Pat. Off. ............ 293/122 |
| 2708856 | 10/1977 | Fed. Rep. of Germany ...... 293/122 |
| 240514 | 11/1986 | Japan . |

OTHER PUBLICATIONS

Compet rpc Fibers, "Compet Fibers For Plastics Reinforcement", 1984. (3 pages).
Owens/Corning Fiberglas, "Textile Fibers For Industry", 1979. (2 pages).

*Primary Examiner*—Margaret A. Focarino
*Assistant Examiner*—Joseph D. Pape
*Attorney, Agent, or Firm*—Harness, Dickey & Pierce

[57] ABSTRACT

A molded composite bumper including a resin and reinforcing thermoplastic fibers having sufficiently compatible elongation characteristics thereby allowing the bumper to sustain higher strains and deformation upon an impact force.

15 Claims, 5 Drawing Sheets

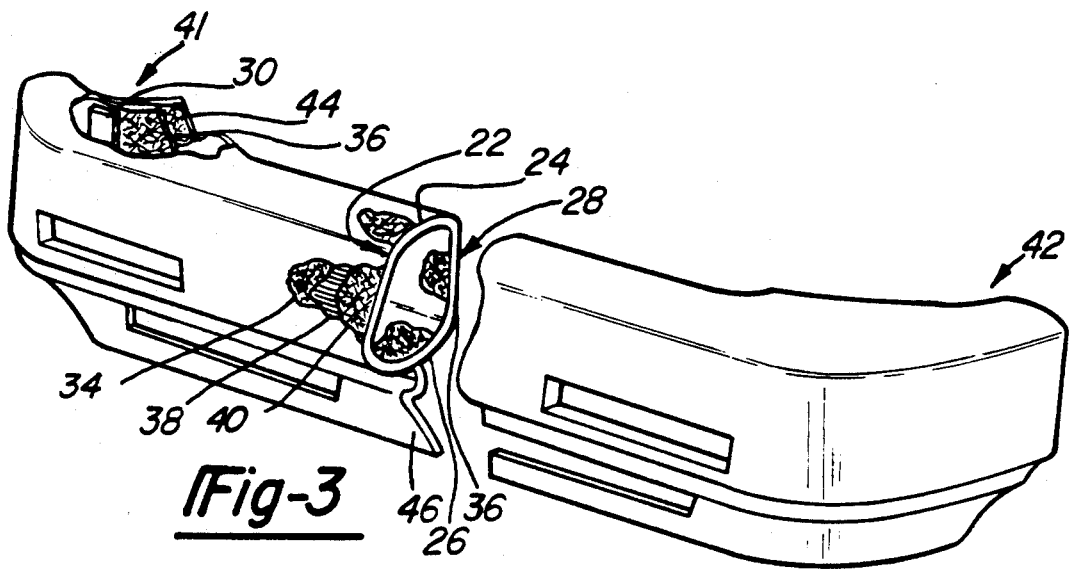
_Fig-3_
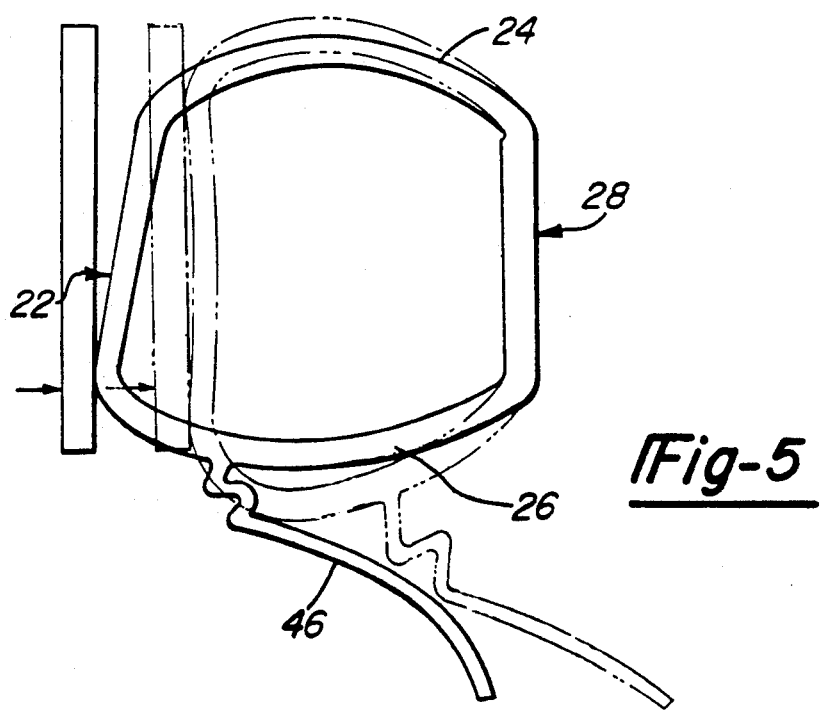
_Fig-5_

MOLDED COMPOSITE BUMPER

CROSS REFERENCE TO RELATED APPLICATION

This is a continuation-in-part application of U.S. Ser. No. 419,745, filed Oct. 11, 1989 now abandoned entitled "Molded Composite Bumper" by Freeman which is assigned to the assignee of the present invention.

BACKGROUND OF THE INVENTION

1. Technical Field

This improvement relates to vehicle bumpers and, more particularly, to a molded polyester fiber reinforced composite vehicle bumper with built-in shock absorbing characteristics.

2. Discussion

Vehicle bumpers are generally formed of a composite consisting of a resin and reinforcing fibers. The types of resins typically utilized include urethane, vinyl ester, polyesters and hybrids. The fibers typically utilized are E glass.

However, problems exist in utilizing glass fibers to reinforce the resin. Glass fibers have low elongation characteristics which subsequently limit the amount of strain that the composite is able to sustain during an impact. In addition, glass fibers and resin have elongation characteristics which are not compatible. The resin typically has higher elongation capability. Thus, the resin could withstand increased strain beyond that required to fail the glass fibers.

However, a composite of resin reinforced with glass fibers possesses low elongation characteristics similar to the elongation characteristics of glass fibers. Therefore, a composite of resin reinforced with glass fibers is not capable of sustaining high strains before ultimate failure due to the glass fiber's limited ability to elastically deform. The composite is strain limited due to the low elongation characteristics of the glass fibers. Thus, when a composite of resin reinforced with glass fibers is utilized in an exterior bumper, the low elongation characteristics of the glass fibers prevents the composite from significantly deforming upon an impact force and thus the bumper would be subject to a premature failure.

The following is a representative, although not exhaustive, list of representative vehicle bumper systems: U.S. Pat. Nos. 3,833,168; 4,208,069; 4,241,945; 4,440,429; 4,466,646; 4,525,005; 4,586,738; 4,671,550 and Japanese Patent No. 62-240514.

Those skilled in the art will appreciate that the designs disclosed in the aforementioned patents each have their own set of disadvantages, as well as advantages. The prior art designs generally utilize designs which are comprised of a composite of resin reinforced with glass fibers which do not possess high strain capabilities. Consequently, the amount of deformation that the prior art designs can sustain before ultimate failure is relatively low.

The present invention is directed towards providing the bumper with the ability to significantly deform without failure upon impact. In addition, the present invention is directed towards utilizing a reinforcing material which has elongation characteristics which are sufficiently compatible and cooperate with the elongation characteristics of resin. Compatible elongation characteristics of the resin and fibers provide the composite bumper with the ability to sustain higher strains before ultimate failure.

SUMMARY OF THE INVENTION

In accordance with the teachings of the present improvement, a vehicle composite bumper is provided with the ability to substantially deform without failure upon impact. The vehicle bumper consists of a molded hollow composite body of resin reinforced with thermoplastic fibers, such as polyester fibers or nylon fibers. The composite body forms an elongated hollow beam which has a longitudinal axis. The hollow beam of the vehicle bumper has a front wall, upper side wall, rear wall and lower side wall. The elongation characteristics of the resin and thermoplastic fibers are sufficiently compatible and cooperate such that the composite beam has the ability to substantially deform without failure upon impact.

BRIEF DESCRIPTION OF THE DRAWINGS

The various advantages of the present invention will become apparent to those skilled in the art after studying the following specification and by reference to the drawings in which:

FIG. 3 is an enlarged perspective view with parts broken away illustrating the fiber orientation in the upper side wall, lower side wall, front wall and rear wall of the bumper of FIG. 2;

FIG. 5 is a cross sectional view illustrating the effect of an impact of force upon the bumper;

DESCRIPTION OF THE PREFERRED EMBODIMENT

Figure 1:
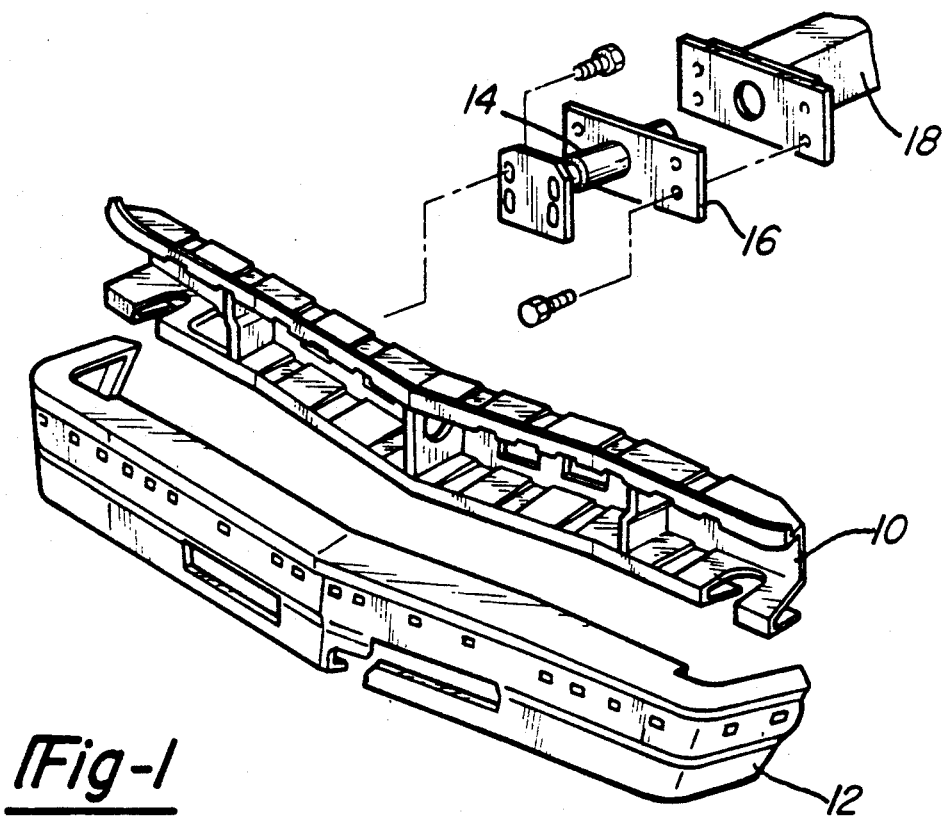
FIG. 1 is an exploded perspective view of a PRIOR ART vehicle bumper which is comprised of a resin reinforced with glass fibers and has a separate reinforcing beam, fascia, energy absorber and mounting bracket.

Referring initially to FIG. 1, the structure shown illustrates a typical vehicle bumper system formed according to the prior art. The bumper is comprised of a composite of resin reinforced with glass fibers. Also, the bumper is made of separate components including a reinforcing beam 10, fascia 12 and energy absorber 14. A mounting bracket 16 is used to attach the separate bumper components to the frame of the vehicle 18. The bumper is comprised of a resin reinforced with glass fibers.

Figure 2:
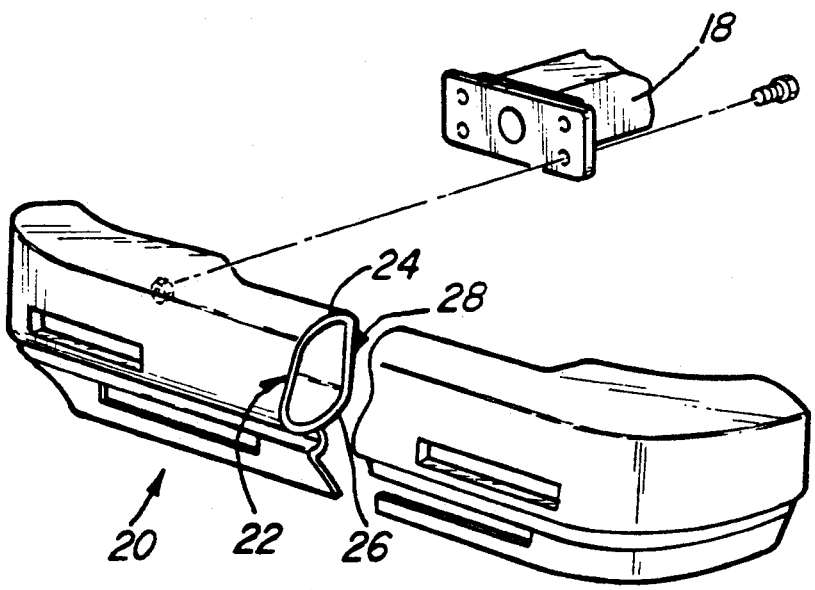
FIG. 2 is an exploded perspective view of a vehicle bumper made in accordance with the teachings of the present invention.

FIG. 2 illustrates a bumper formed according to the present invention which is generally designated by the numeral 20. The bumper 20 is shaped as a hollow elongated beam, with a front wall 22, an upper side wall 24, a lower side wall 26 and a rear wall 28. The rear wall 28 of the bumper 20 is attached directly to the frame 18 of the vehicle 18, with the aid of an optional mounting plate 30 (shown in FIG. 3) disposed on the inside of the rear wall 28.

Referring to FIG. 3, the bumper 20 is fabricated of layers of fiber reinforced plastic or composite material including fibrous reinforcing material impregnated with a suitable thermosetting resin. Thermoplastic fibrous reinforcing material is found in the upper side wall 24 and lower side wall 26. The thermoplastic fibrous reinforcing material provides the bumper with the much needed characteristics of strength and toughness. Thermoplastic fibers also have positive elongation characteristics. For purposes of this invention, the term "positive elongation characteristics" means that the thermoplastic fibers have a sufficient ultimate strain to preclude failure based on fiber strain. The glass fibers do not have a sufficient ultimate strain, and therefore are subject to failure due to the fiber strain. Thus, the ultimate strain of the thermoplastic fibers exceeds that of the glass fibers. In addition, the ultimate strain of the thermoplastic fibers is compatible with that of a high elongation resin system. Thus, a bumper comprised of a resin reinforced with thermoplastic fibers has a higher breaking elongation than a bumper comprised of a resin reinforced with glass fibers. This is because the ultimate strain of a high strain resin reinforced with fibers will be a function of the limiting strain of the fiber. The fibers are the primary load carrying component. Therefore, since the thermoplastic fibers have a higher strain to failure than the glass fibers, the resin reinforced with thermoplastic fibers will have a higher breaking elongation than resin reinforced glass fibers.

Figure 4:
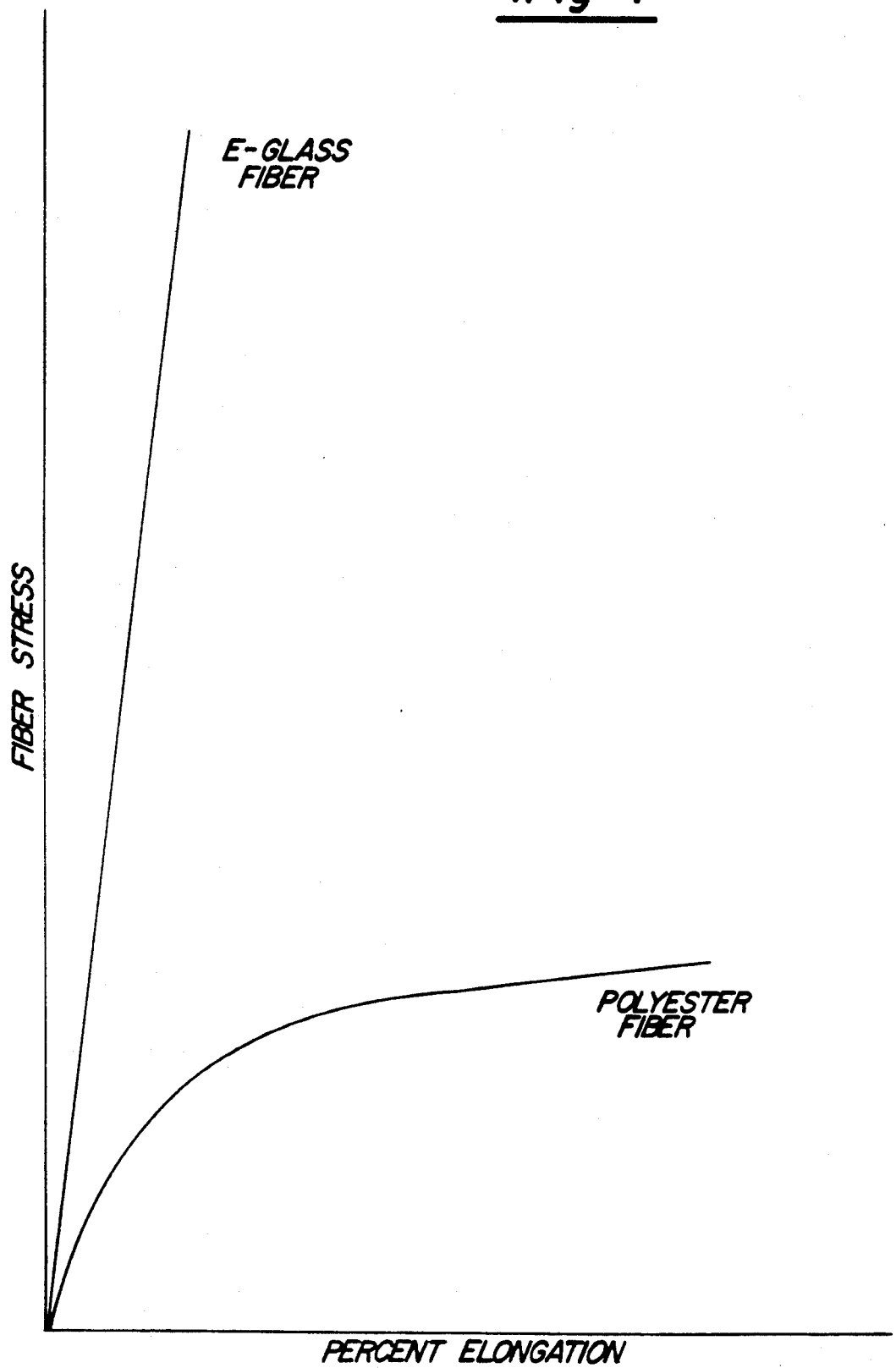
FIG. 4 is a graph displaying the elongation characteristics of glass fibers and thermoplastic fibers.

In FIG. 4, the percent elongation of both glass fibers and thermoplastic fibers can be determined at any given stress. The breaking elongation is defined as the amount of elongation the fiber can sustain at ultimate failure. FIG. 4 demonstrates that glass fibers have a breaking elongation of approximately five percent (%). Thus, glass fibers can elongate approximately five percent of their total length before ultimate failure.

However, thermoplastic fibers have a much higher breaking elongation, approximately twenty-two percent (%). One reason for the increase in the breaking elongation is the ability of the thermoplastic fibers to deform without failure upon impact. Glass fibers possess a limited ability to elastically deform upon impact, thus limiting their breaking elongation. Therefore, thermoplastic fibers have a greater breaking elongation than glass fibers.

The resin elongation characteristics are more compatible with elongation characteristics of the thermoplastic fibers than with the elongation characteristics of the glass fibers. When resin is reinforced with chopped glass fibers, the breaking elongation of the composite is approximately 3 percent (%). However, since the elongation characteristics of the thermoplastic fibers and resin are sufficiently compatible and cooperate, the breaking elongation of the composite is approximately ten percent (%).

In FIG. 3 and FIGS. 8-10, the thermoplastic fibrous reinforcing material in the upper side wall 24 and lower side wall 26 also has a random orientation relative to the longitudinal axis. The thermoplastic fibers are approximately one to two inches in length. The random orientation of the fibers allows the bumper to deform without failure upon impact of the bumper 20. The composite of resin reinforced with randomly orientated thermoplastic fibers extends beyond the upper side wall 24 and lower side wall 26 and continues around to the front wall 22 of the bumper 20 and forms the outer section 34 of a multi-sectioned front wall 22. The random fibrous orientation within the front wall 22 allows the bumper to withstand higher strains and helps to distribute the force of the impact to the upper side wall and lower side wall. The composite of resin reinforced with thermoplastic fibers, where the fibers have a random orientation relative to the longitudinal axis of the bumper, extends beyond the upper side wall 24 and lower side wall 26 and continues around to the rear wall 28 of the bumper 20 to form an inner section 36 of the rear wall 28. Thus, the fibrous reinforcing material within the upper side wall 24, lower side wall 26, front wall 22 outer section 34 and the rear wall 28 inner section 36, forms a continuous layer throughout the bumper 20.

The front wall 22 outer section 34 consists of a composite of resin reinforced with thermoplastic fibers randomly orientated relative to the longitudinal axis of the bumper. The fiber orientation and the chosen composite allow the front wall 22 outer section 34 to withstand higher strains and to deform without failure upon impact. Thus, a composite of resin reinforced with thermoplastic fibers is able to deform without failure upon an impact. The composite is also able to sustain greater strains before ultimate failure. These characteristics provide the composite of resin reinforced with thermoplastic fibers the ability to have a breaking elongation of approximately ten percent (%). Therefore, an exterior bumper comprised of a resin reinforced with thermoplastic fibers has the ability to elastically deform and to sustain greater strains before ultimate failure.

The front wall 22 also has a middle section 38 with a preselected fiber orientation approximately parallel relative to the longitudinal axis of the bumper 20. The middle section 38 is comprised of a composite of resin reinforced with glass fibers. The chosen composite and the particular fiber orientation in the front wall 22 middle section 38 helps to transmit the force impact from the front wall 22 into the upper side wall 24 and lower side wall 26. The resin reinforced with glass fibers provides a degree of stiffness to the front wall 22.

The front wall 22 also optionally has an inner section 40 which is comprised of a composite of resin reinforced with thermoplastic fibers randomly orientated relative to the longitudinal axis of the bumper 20. The composite which comprises the front wall 22 inner section 40 is substantially, similar to the composite which comprises the front wall outer section 34. The chosen composite and fibrous orientation which exists in the front wall inner section 40 assists in transmitting the force impact from the front wall 22 unto the upper side wall 24 and lower side wall 26, and ultimately the bumper supports 41 and 42.

The different sections of the front wall 22 including the outer section 34, middle section 38, and inner section 40 have various thicknesses. The front wall outer section 34 has a thickness of approximately two to three times greater than the front wall middle section 38 and front wall inner section 40. The front wall middle section 38 and front wall inner section 40 are approximately the same thickness.

At the bumper supports 41 and 42, the areas where the bumper 20 is attached to the vehicle frame 18, there is an outer section 44 to the rear wall 28. The outer section 44 provides local reinforcement in order to minimize the concentration of stress at the bumper supports 41 and 42. The outer section 44 consists of a composite of resin reinforced with thermoplastic fibers randomly orientated relative to the longitudinal axis of the bumper 20. An optional metallic mounting plate 30 is disposed of on the inner section 36 of the rear wall 28 at the bumper supports 41 and 42.

A fascia 46 extends from the upper side wall 24 or the lower side wall 26. The fascia 46 may be fabricated of the same resin or a different resin as that which impregnates the fibrous reinforcing material in the composite.

The effect of an impact of a force upon the vehicle bumper 20 is illustrated by FIG. 5. Upon the impact of the force on the bumper 20, the front wall 22 of the bumper 20 deflects inward, transmitting some of the force unto the upper wall 24 and lower side wall 26. The elongation characteristics of the thermoplastic fibers allow the bumper to deflect inward upon a force impact. Also, the upper side wall 24 and lower side wall 26 will deflect outward, elastically deforming, thereby reducing the chance of permanent deformation or fracture of the bumper. The upper side wall 24 and lower side wall 26 will absorb the impact of the force, thus acting as a shock absorber and eliminating the need for a separate shock absorbing device.

The bumper 20 is preferably made by a process referred to as resin transfer molding. The details of this process can be found in the following incorporated-by-reference patent application and patents: U.S. Pat. No. 4,863,771, issued Sep. 5, 1989, U.S. Pat. No. 4,849,147, issued Jul. 18, 1989; U.S. Pat. No. 4,740,346 issued Apr. 26, 1988; U.S. Pat. No. 4,724,115 issued Feb. 9, 1988. As a result only the details necessary for the understanding of the present invention are set forth below.

Figure 6:
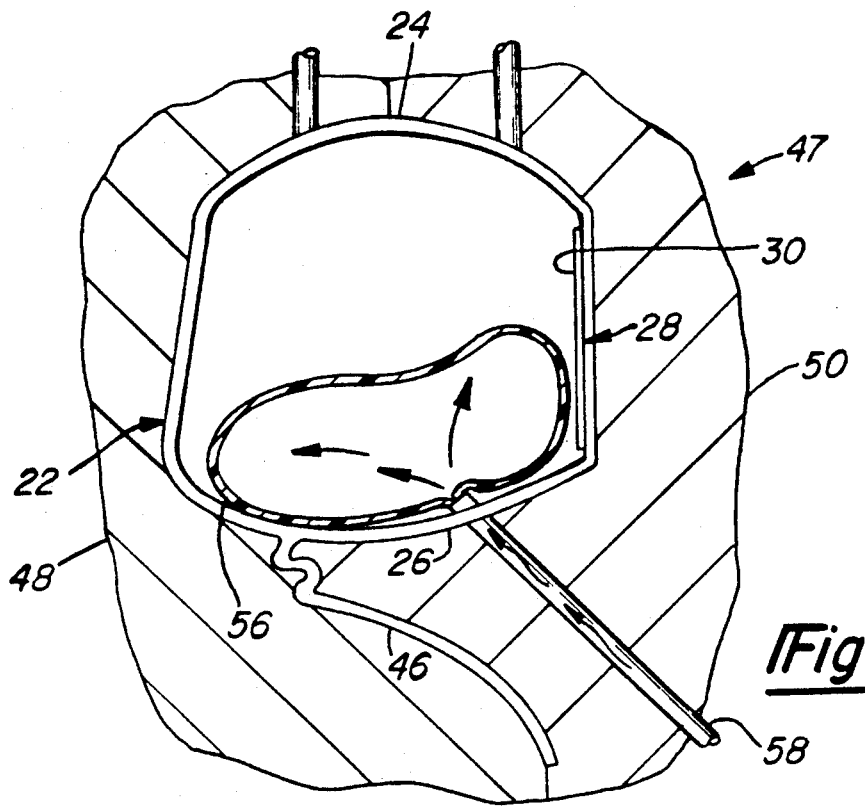
FIG. 6 is a cross sectional view of a mold during one step in making the bumper.
Figure 7:
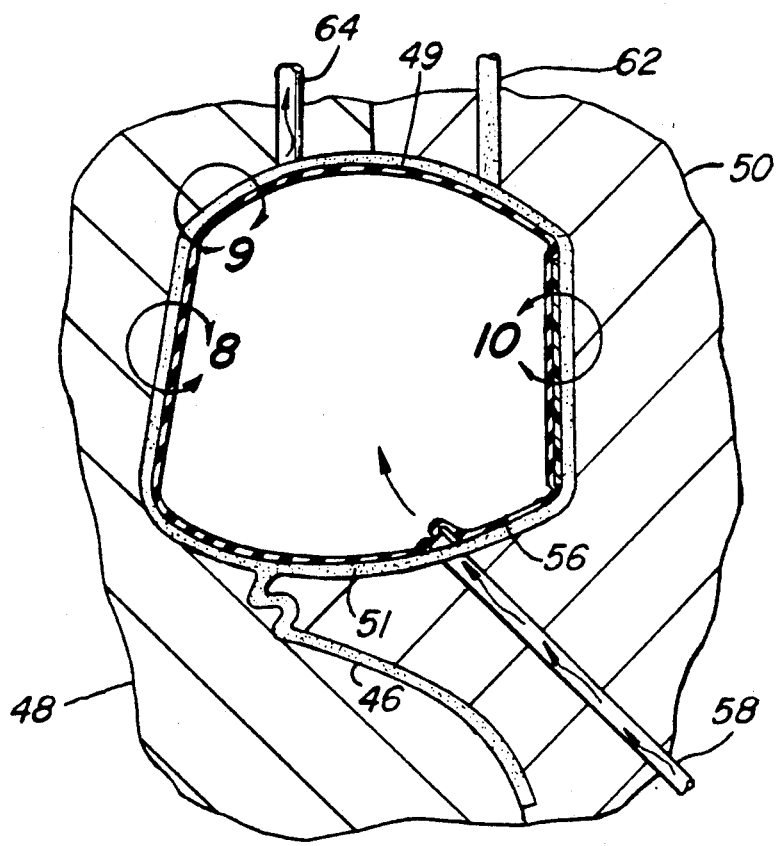
FIG. 7 is a cross sectional of the mold illustrating a subsequent step in making the bumper.
Figure 8:
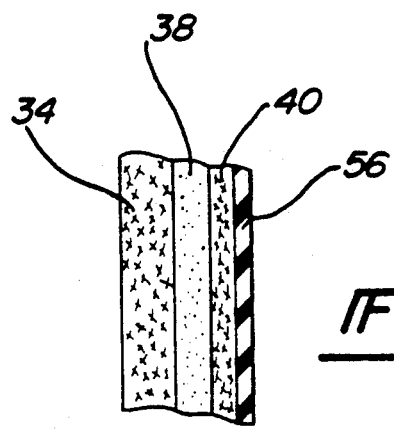
FIG. 8 is an enlarged perspective view of section 8 of the mold of FIG. 7.
Figure 9:
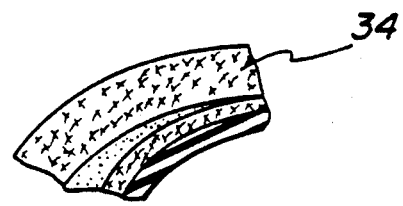
FIG. 9 is an enlarged perspective view of section 9 of the mold of FIG. 7.
Figure 10:
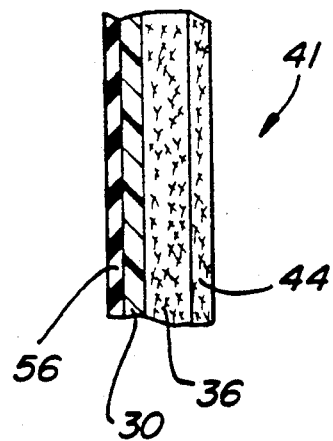
FIG. 10 is an enlarged perspective view of section 10 of the mold of FIG. 7.

Briefly, the process involves the preliminary making of thermoplastic fiber preforms in the general shape of the mold cavity surfaces of the mold used during curing of the resin. The preforms are generally made by adding a suitable binder to the fibers so that the fibers generally hold their shape. These fiber preforms are then laid along the mold cavity surfaces which cooperate to define the desired shape of the bumper 20 and/or fascia 46. Alternatively, the preforms can be attached to a thin shell-like support and the subassembly placed into the mold. As illustrated by FIG. 6 and FIG. 7, the mold 47 employs a first die 48 and a second die 50. The surfaces defined by the dies 48 and 50 are adopted to form the front wall 22, upper side wall 24, lower side wall 26, and rear wall 28 of the bumper 20.

In reference to FIG. 7, layers of the thermoplastic fiber preforms, represented by 49 and 51 form the upper side wall 24 and lower side wall 26 respectively. The thermoplastic fibers are randomly orientated relative to the longitudinal axis of the bumper 20. These layers represented by 49 and 51 also form the outer section 34 of the bumper front wall 22, as well as the rear wall inner section 36. Layers of thermoplastic fibrous reinforcing material represented by 49 and 51 also form the front wall inner section 40.

As illustrated in FIG. 6, an inflatable member 56 is inserted into the mold cavity and a source of compressed air is connected via a suitable conduit 58 extending through the second die 50 and into the member 56. The purpose of the compressed air is to expand the member 56 and to maintain the shape of the member 56 during the subsequent resin injection step. Similarly, a preform, with thermoplastic fibers randomly orientated relative to the longitudinal axis of the bumper 20 and which forms the rear wall 28 outer section 44, is placed on portions of the mold die surface defining the bumper/vehicle attachment areas, the bumper supports 41 and 42. Alternatively, a thin, self-supporting hollow body akin to a plastic milk jug can be used instead of the collapsible member shown in the drawings. In such case, the preforms are attached to the body which is then placed into the mold. Compressed air can be applied to prevent the body from collapsing when the resin is injected. This alternative method is presently preferred.

FIG. 7 illustrates the resin being injected through a conduit 62 and into the layers of the fibrous reinforcing material. The injected resin also binds the various sections of the front wall and rear wall. Suitably spaced vents 64 can be provided to allow air to escape during the resin injection step. The fascia 46 may be formed of a resin, which may or may not be the same resin which impregnates the fibrous reinforcing material. Suitable resins include vinyl ester and urethane.

In FIGS. 6 and 7, the fascia 46 is shown as being molded simultaneously with the bumper beam portion. Still other ways in which to attach the fascia 46 to the bumper 20 beam portion can also be employed.

After the layers of the fibrous reinforcing material have been impregnated with the resin, the mold remains closed until the resin cures and the resultant structure, the bumper 20, becomes rigid. Depending on the resin, the mold can be heated as required. Subsequently, the bumper 20 is removed from the mold, and the compressed air disconnected from the member 56. The member 56 may collapse inside the mold cavity due to the discontinuance of the compressed air, but it is not necessary to remove the member 56 from the bumper 20.

After the bumper is removed from the mold it can be trimmed and painted as desired. It is then ready for attachment directly to the vehicle frame 18 in a manner similar to that shown in FIG. 2. The mounting plate 30 on the rear wall 28 inner section 36 of the bumper 20 adds additional support which may or may not be necessary depending upon the structural configuration. The mounting plate 30 can also be molded in place as part of the previously described molding operation.

The present improvement replaces the numerous parts in existing bumpers with a molded composite bumper, thus eliminating the need for a separate energy absorber. The molded composite bumper in the present improvement still maintains the entire design flexibility that is associated with the multi-piece design. In addition, the molded composite bumper has the possible advantage of being lighter and less expensive to manufacture and assemble.

Also, the molded composite bumper in the present improvement consists of a composite of resin reinforced with thermoplastic fibers, instead of the commonly used composite of resin reinforced with glass fibers. The elongation characteristics of the resin and thermoplastic fibers are sufficiently compatible such that the composite of resin reinforced with thermoplastic fibers has a breaking elongation of approximately ten percent (10%). This is a substantial increase over the breaking elongation of the composite, resin reinforced with glass fibers, which has a breaking elongation of approximately three percent (3%).

The various advantages of the present invention will become apparent to those skilled in the art after having the benefit of reading the foregoing specification and by reference to the following claims.

What is claimed is:

1. A bumper for a vehicle comprising:
a molded hollow composite body of thermosetting resin reinforced with thermoplastic fibers forming an elongated hollow beam having a longitudinal axis; said beam having a front wall, an upper side wall, a lower side wall and a rear wall; and whereby the elongation characteristics of the thermoplastic fibers and the thermosetting resin are compatible, thereby providing for a composite having elongation characteristics which enable the beam to elongate without breaking after being substantially deformed upon impact.

2. The bumper of claim 1 wherein the material comprising the beam has a breaking elongation of approximately 10%.

3. A bumper for a vehicle comprising:
a molded hollow composite body of thermosetting resin reinforced with thermoplastic fibers forming an elongated hollow beam having a longitudinal axis; said beam having a front wall, an upper side wall, a lower side wall and a rear wall; whereby the elongation characteristics of the thermoplastic fibers and the thermosetting resin cooperate to enable the beam to elongate without breaking after being substantially deformed upon impact; and wherein said front wall comprises a plurality of sections, each of said sections being defined by at least one pre-formed composite layer having reinforcing fibers and resin therein.

4. The bumper of said claim 3 wherein said plurality of sections comprises an outer section, a middle section and an inner section.

5. A bumper according to claim 4, wherein said thermoplastic fibers of said front wall outer section are randomly orientated relative to the longitudinal axis of the bumper.

6. A bumper according to claim 4, wherein said front wall middle section comprises glass fibers orientated approximately parallel to the longitudinal axis of the bumper.

7. The bumper according to claim 4, wherein said thermoplastic fibers of said front wall inner section are randomly orientated relative to the longitudinal axis of the bumper.

8. The bumper according to claim 4, wherein said thermoplastic fibers of said upper side wall and said lower side wall are randomly orientated relative to the longitudinal axis of the bumper.

9. The bumper according to claim 4, wherein said rear wall comprises a plurality of sections, including a locally inner section and outer section, each of said sections having at least one-preformed composite layer having randomly orientated reinforcing thermoplastic fibers and resin therein.

10. The bumper according to claim 1, which further comprises means for mounting said bumper to a vehicle frame.

11. The bumper according to claim 1, wherein said composite body comprises a single substantially continuous common piece of pre-formed thermosetting resin-impregnated fibrous material.

12. A molded fiber reinforced composite energy-absorbing bumper for an automative vehicle, comprising:
a molded, elongated, hollow, resin impregnated, substantially continuous structure having a longitudinal axis; said structure having a front wall, an upper side wall, a lower side wall, and a rear wall;
the front wall including at least an outer, middle and inner sections, each such section having at least one preformed layer having reinforcing fibers arranged in one or more distinct, preselected directions, and the layers being impregnated with a thermosetting resin material, which binds the outer, middle and inner sections together into a rigid structure;
the front wall outer section and front wall inner section having polyester fibers randomly orientated relative to the longitudinal axis of the continuous structure;
the front wall middle section having glass fibers unidirectionally arranged substantially in parallel to the longitudinal axis of the continuous structure;
the upper and lower side walls each having at least one pre-formed layer having reinforcing polyester fibers randomly orientated relative to the longitudinal axis of the continuous structure, and the layers being impregnated with a thermosetting resin material; and
the rear wall having at least one pre-formed layer having reinforcing polyester fibers randomly orientated relative to the longitudinal axis of the continuous structure, and the layers being impregnated with a thermosetting resin material.

13. The bumper according to claim 12, wherein said thermosetting resin material is a vinyl ester.

14. The bumper according to claim 12, wherein said thermosetting resin material is an urethane.

15. A bumper for a vehicle comprising:
a molded hollow composite body of thermosetting resin reinforced with thermoplastic fibers forming an elongated hollow beam having a longitudinal axis; said beam having a front wall, an upper side wall, a lower side wall and a rear wall; said front wall having at least two sections, a first section reinforced with said thermoplastic fibers and a second section reinforced with glass fibers; and whereby the elongation characteristics of the thermoplastic fibers and the thermosetting resin cooperate, thereby providing for a composite having elongation characteristics which enable the beam to elongate without breaking after being substantially deformed upon impact.

* * * * *